(12) United States Patent
Ganti et al.

(10) Patent No.: US 12,411,709 B2
(45) Date of Patent: Sep. 9, 2025

(54) ANNOTATION OF A MACHINE LEARNING PIPELINE WITH OPERATIONAL SEMANTICS

(71) Applicant: International Business Machines Corporation, Armonk, NY (US)

(72) Inventors: Raghu Kiran Ganti, White Plains, NY (US); Mudhakar Srivatsa, White Plains, NY (US); Carlos Henrique Andrade Costa, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 714 days.

(21) Appl. No.: 17/538,301

(22) Filed: Nov. 30, 2021

(65) Prior Publication Data

US 2023/0168923 A1 Jun. 1, 2023

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
CPC ....................................................... G06F 9/4881
USPC ........................................................ 718/103
See application file for complete search history.

(56) References Cited

U.S. PATENT DOCUMENTS

| | | | | |
|---|---|---|---|---|
| 6,370,589 B1 * | 4/2002 | Sieber | ................. | G06F 11/3688 |
| | | | | 719/330 |
| 8,356,185 B2 * | 1/2013 | Olson | ................... | G06F 9/3867 |
| | | | | 712/218 |
| 8,537,160 B2 * | 9/2013 | Hargrove | ............. | G06T 11/206 |
| | | | | 345/619 |
| 8,928,665 B2 * | 1/2015 | Fonseca Da Trindade | ................. | |
| | | | | G06T 11/206 |
| | | | | 707/798 |
| 9,053,437 B2 * | 6/2015 | Adler | ................. | G06Q 10/0637 |
| 9,158,797 B2 * | 10/2015 | Stanfill | ............... | G06F 16/2428 |
| 9,524,366 B1 * | 12/2016 | Watanabe | ............. | G06F 30/327 |
| 9,727,438 B2 * | 8/2017 | Buxbaum | ........... | G06F 11/3476 |
| 9,811,322 B1 * | 11/2017 | Sindelar | ................. | G06F 8/433 |

(Continued)

FOREIGN PATENT DOCUMENTS

CN 104679807 A 6/2015
CN 105117286 A 12/2015

(Continued)

OTHER PUBLICATIONS

List of IBM Patents or Applications Treated as Related, Nov. 2021.

(Continued)

*Primary Examiner* — Mehran Kamran
(74) *Attorney, Agent, or Firm* — Jared C. Chaney

(57) ABSTRACT

A system, computer program product, and method are provided for distributed data workflow semantics. A pipeline, such as a machine learning pipeline, is represented in a data flow graph (DFG) with nodes and edges. The represented nodes are configured to be annotated with an operational semantic. On order of execution of the pipeline is discovered through the node annotation(s) represented in the annotated DFG, and execution of the pipeline is based on the discovered order. A control signal formatted based on the executed pipeline is configured to dynamically and selectively control an operatively coupled physical hardware device.

20 Claims, 10 Drawing Sheets

(56) References Cited

U.S. PATENT DOCUMENTS

| | | | |
|---|---|---|---|
| 10,871,950 B2* | 12/2020 | De Smet | G06F 16/9024 |
| 10,902,121 B2* | 1/2021 | Chari | G06N 7/01 |
| 11,074,107 B1* | 7/2021 | Nandakumar | G06F 8/10 |
| 2004/0250157 A1* | 12/2004 | Barga | G06F 11/1438 714/2 |
| 2009/0235252 A1* | 9/2009 | Weber | G06F 8/10 718/100 |
| 2009/0327196 A1 | 12/2009 | Studer et al. | |
| 2010/0211953 A1 | 8/2010 | Wakeling et al. | |
| 2014/0108438 A1* | 4/2014 | Duffy | G06F 16/9024 707/756 |
| 2015/0222730 A1* | 8/2015 | Gower | H04L 65/70 709/203 |
| 2015/0293784 A1* | 10/2015 | Allen | G06F 9/48 718/102 |
| 2016/0103706 A1* | 4/2016 | Novaes | G06Q 10/10 718/102 |
| 2016/0117189 A1* | 4/2016 | Osborne | G06F 9/30087 718/102 |
| 2018/0189389 A1* | 7/2018 | Baldini Soares | G06F 16/367 |
| 2019/0073228 A1* | 3/2019 | Stanfill | G06F 9/4862 |
| 2019/0140994 A1* | 5/2019 | Snider | H04L 51/234 |
| 2019/0229996 A1* | 7/2019 | ChoFleming, Jr. | G06F 9/4494 |
| 2019/0378052 A1* | 12/2019 | Badhwar | G06N 20/00 |
| 2020/0265324 A1 | 8/2020 | Ferreira et al. | |
| 2021/0065048 A1 | 3/2021 | Salonidis et al. | |
| 2021/0118210 A1* | 4/2021 | Maruyama | G06T 11/206 |
| 2021/0216905 A1* | 7/2021 | Floratou | G06N 5/02 |
| 2022/0066905 A1 | 3/2022 | Lee et al. | |
| 2022/0092471 A1 | 3/2022 | Jaeger et al. | |
| 2022/0138266 A1* | 5/2022 | Wang | G06N 3/044 707/722 |
| 2022/0215260 A1* | 7/2022 | Dasoulas | G06N 3/048 |
| 2022/0374288 A1 | 11/2022 | Kibardin et al. | |
| 2023/0106416 A1* | 4/2023 | Gupte | G06F 16/288 706/45 |
| 2023/0168923 A1* | 6/2023 | Ganti | G06F 9/5038 718/103 |
| 2023/0169354 A1 | 6/2023 | Srivatsa et al. | |
| 2023/0169408 A1 | 6/2023 | Andrade Costa et al. | |

FOREIGN PATENT DOCUMENTS

| | | |
|---|---|---|
| CN | 105843684 A | 8/2016 |
| CN | 107273193 A | 10/2017 |
| CN | 109814986 A | 5/2019 |
| CN | 110275765 A | 9/2019 |
| CN | 110362315 A | 10/2019 |
| CN | 111158800 A | 5/2020 |
| CN | 111176817 A | 5/2020 |
| CN | 112379995 A | 2/2021 |
| CN | 112463346 A | 3/2021 |

OTHER PUBLICATIONS

Betancourt, Frank, et al., "openDIEL: A Parallel Workflow Engine and Data Analytics Framework," Proceedings of the Practice and Experience in Advanced Research Computing on Rise of the Machines (learning), 2019, pp. 1-7.

Grafberger et al. Lightweight Inspection of Data Preprocessing in Native Machine Learning Pipelines, Jan. 2021 (Year: 2021), 8 pages.

Nikitin, Nikolay O., et al., "Automated Evolutionary Approach for the Design of Composite Machine Learning Pipelines," arXiv preprint arXiv:2106.15397, 2021, 18 pages.

Phani et al., "LIMA: Fine-grained Lineage Tracing and Reuse in Machine Learning Systems" (Year: 2021), 14 pages.

Zhang et al., "Diagnosing Machine Learning Pipelines with Fine-grained Lineage", 2017, 11 pages.

Patel, Dhaval, et al. "Smart-ml: A system for machine learning model exploration using pipeline graph." 2020 IEEE International Conference on Big Data (Big Data). IEEE, 2020. (Year: 2020).

Shang, et al. Democratizing Data Science Through Interactive Curation of ML Pipelines, in Proceedings of the International Conference on Management of Data, Jun. 25, 2019, 18 pages.

Sparks, et al., KeystoneML: Optimizing Pipelines for Large-Scale Advanced Analytics, IEEE 33rd International Conference on Data Engineering (ICDE), Apr. 2017, pp. 535-546.

* cited by examiner

ANNOTATION OF A MACHINE LEARNING PIPELINE WITH OPERATIONAL SEMANTICS

BACKGROUND

The present embodiments relate to a computer system, computer program product, and a computer-implemented method to encode a representation of a machine learning pipeline. More specifically, the embodiments are directed to annotating the pipeline representation with operational semantics to dynamically and selectively control an operatively coupled physical hardware device.

A graph is a series of vertexes connected by edges. In a directed graph, the edges are connected so that each edge only goes one way. A directed acyclic graph (DAG) means that the graph is not cyclic, or that it is impossible to start at one point in the graph and traverse the entire graph. Each edge is directed from an earlier edge to a later edge. This is also known as a topological ordering of a graph. Accordingly, the DAG is a directed graph with no directed cycles.

Similar to the DAG, a data flow graph (DFG) shows the flow of data through a program, given a starting data element. In the DFG, nodes represent operations to be applied to data objects, and arcs represent channels for data objects to move from a producing node to a consuming node. Using the DFG, control and data aspects of a program are represented in one integrated model. When data objects are available at input ports of a node and certain conditions are satisfied, the node is said to be enabled. The embodiments shown and described herein are directed to representing a pipeline in a DFG, and exploiting the representation to efficiently and effectively manage complex multi-steps analytics and machine learning pipelines.

SUMMARY

The embodiments disclosed herein include a computer system, computer program product, and computer-implemented method representing a pipeline in a DFG, selectively annotating or receiving annotations in the form of operational semantics, and executing the represented and annotated pipeline. Those embodiments are further described below in the Detailed Description. This Summary is neither intended to identify key features or essential features or concepts of the claimed subject matter nor to be used in any way that would limit the scope of the claimed subject matter.

In one aspect, a computer system is provided with a processor operatively coupled to memory, and an artificial intelligence (AI) platform operatively coupled to the processor. The AI platform is configured with a pipeline manager, a processing manager, an evaluator, and a director configured with functionality to support pipeline representation, and selective annotation of the represented pipeline. The pipeline manager is configured to represent the pipeline in the form of a data flow graph (DFG), with nodes and edges, and with the individual nodes therein being a representation of an instance of a mathematical operation, and individual edges being a representation of an object or an object reference. The processing manager, which is operatively coupled to the pipeline manager, is configured to pre-process the pipeline as represented in the DFG. The pre-processing includes selective annotation of one or more of the represented nodes with an operational semantic. Supported operational semantics includes an input combination, a firing combination, a state of the node, or an output condition. In an embodiment, the selective node annotation includes two or more of the operational semantics. The evaluator, which is operatively coupled to the processing manager, is configured to evaluate the selectively annotated DFG representing the pipeline. The evaluation includes discovering an order of execution of the pipeline based on the node annotation(s), and further supports control of a scheduling order based on the evaluation. The director is configured to execute the pipeline as represented in the annotated DFG, which in an embodiment dictates control of an operatively coupled device.

In another aspect, a computer program product is provided with a computer readable storage medium having embodied program code. The program code is executable by the processing unit with functionality to support pipeline representation, and selective annotation of the represented pipeline. Program code is provided to represent the pipeline in the form of a data flow graph (DFG), with nodes and edges, and with the individual nodes therein being a representation of an instance of a mathematical operation, and individual edges being a representation of an object or an object reference. Program code is further provided to pre-process the pipeline as represented in the DFG. The pre-processing includes selective annotation of one or more of the represented nodes with an operational semantic. Supported operational semantics includes an input combination, a firing combination, a state of the node, or an output condition. In an embodiment, the selective node annotation includes two or more of the operational semantics. Program code is configured to evaluate the annotated DFG representing the pipeline, with the evaluation including discovering an order of execution of the pipeline based on the node annotation(s), and further supports program code to control a scheduling order based on the evaluation. Program code is further configured to execute the pipeline as represented in the annotated DFG, which in an embodiment dictates control of an operatively coupled device.

In yet another aspect, a method is provided to support pipeline representation, and selective annotation of the represented pipeline. The pipeline is represented as a data flow graph (DFG), with nodes and edges, and with the individual nodes therein being a representation of an instance of a mathematical operation, and individual edges being a representation of an object or an object reference. The representation of the pipeline is subject to pre-processing, that includes selectively annotating of one or more of the represented nodes with an operational semantic. Supported operational semantics includes an input combination, a firing combination, a state of the node, or an output condition. In an embodiment, the selective node annotation includes two or more of the operational semantics. The annotated DFG representing the pipeline is evaluated, with the evaluation including discovering an order of execution of the pipeline based on the node annotation(s), and further controlling a scheduling order based on the evaluation. The pipeline as represented in the annotated DFG and subject to the pre-processing is subject to execution, which in an embodiment dictates control of an operatively coupled device.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

FIG. 1 depicts a block diagram illustrating a block diagram of an example annotated DFG.

DETAILED DESCRIPTION

Figure 1:
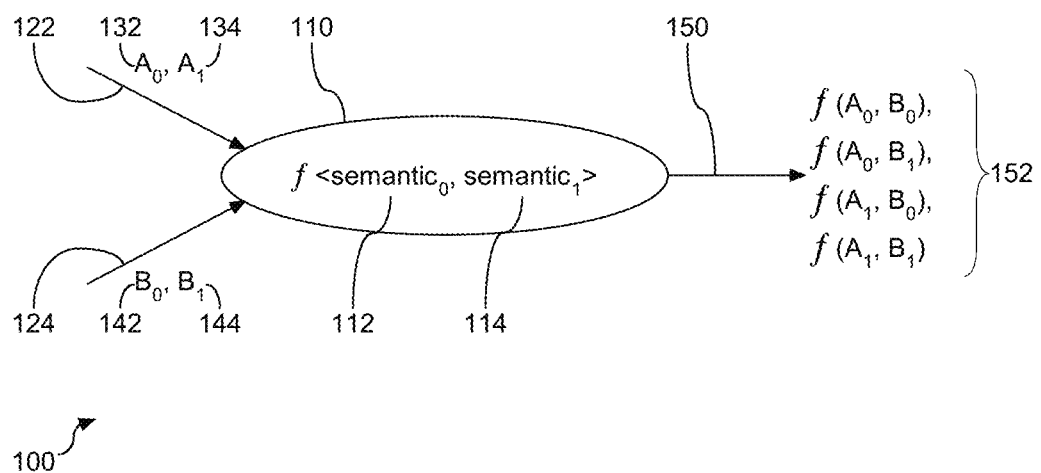

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Artificial Intelligence (AI) relates to the field of computer science directed at computers and computer behavior as related to humans. AI refers to the intelligence when machines, based on information, are able to make decisions, which maximizes the chance of success in a given topic. More specifically, AI is able to learn from a data set to solve problems and provide relevant recommendations. For example, in the field of artificial intelligent computer systems, natural language (NL) systems (such as the IBM Watson® artificially intelligent computer system or other natural language interrogatory answering systems) process NL based on system acquired knowledge.

In the field of AI computer systems, natural language processing (NLP) systems process natural language based on acquired knowledge. NLP is a field of AI that functions as a translation platform between computer and human languages. More specifically, NLP enables computers to analyze and understand human language. Natural Language Understanding (NLU) is a category of NLP that is directed at parsing and translating input according to natural language principles. Examples of such NLP systems are the IBM Watson® artificial intelligent computer system and other natural language question answering systems.

Machine learning (ML), which is a subset of AI, utilizes algorithms to learn from data and create foresights based on the data. ML is the application of AI through creation of models, for example, artificial neural networks that can demonstrate learning behavior by performing tasks that are not explicitly programmed. There are different types of ML including learning problems, such as supervised, unsupervised, and reinforcement learning, hybrid learning problems, such as semi-supervised, self-supervised, and multi-instance learning, statistical inference, such as inductive, deductive, and transductive learning, and learning techniques, such as multi-task, active, online, transfer, and ensemble learning.

At the core of AI and associated reasoning lies the concept of similarity. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly. Existing solutions for efficiently identifying objects and understanding NL and processing content response to the identification and understanding as well as changes to the structures are extremely difficult at a practical level.

Artificial neural networks (ANNs) are models of the way the nervous system operates. Basic units are referred to as neurons, which are typically organized into layers. The ANN works by simulating a large number of interconnected processing units that resemble abstract versions of neurons. There are typically three parts in an ANN, including an input layer, with units representing input fields, one or more hidden layers, and an output layer, with a unit or units representing target field(s). The units are connected with varying connection strengths or weights. Input data is presented to the first layer, and values are propagated from each neuron to neurons in the next layer. At a basic level, each layer of the neural network includes one or more operators or functions operatively coupled to output and input. The outputs of evaluating the activation functions of each neuron with provided inputs are referred to herein as activations. Complex neural networks are designed to emulate how the human brain works, so computers can be trained to support poorly defined abstractions and problems where training data is available. ANNs are often used in image recognition, speech, and computer vision applications.

A machine learning pipeline, hereinafter referred to as a pipeline, is an end-to-end construct that orchestrates the flow of data into and output from a machine learning model, or in an embodiment a set of multiple machine learning models. The pipeline includes raw data, features, outputs, the machine learning model(s) and model parameters, and prediction output. The pipeline consists of multiple sequential steps that do everything from data extraction and pre-processing to model training and deployment. Accordingly, the pipeline codifies the workflow it takes to produce a machine learning model.

Integrating AI and ML technologies with cloud-native environments is an increasingly common scenario, driven in part by use of microservices and the need to scale. Developers are faced with the challenge to not only build machine learning applications, but to ensure that they run well in production in a cloud-native and hybrid cloud environments. As shown and described herein, the DFG is leveraged as a tool to represent the pipeline. The DFG is annotated or subject to annotation with operational semantics to simplify integration, scaling, and acceleration of complex multi-step analytics and ML pipelines in a distributed network environment. The annotated DFG functions as a framework to simplify integration, scaling, and acceleration of complex multi-step analytics and machine learning pipelines.

Referring to FIG. 1, a block diagram (100) is provided to illustrate an example annotated DFG. As shown, a node (110) is shown with two edges (122) and (124). The node (110) represents an instance of a mathematical operation, and each of the edges represents an input object or an input object reference, hereinafter referred to an input object. In addition to the mathematical operation, the node (110) is annotated with two or more operational semantics, shown herein as a first semantic, $semantic_0$ (112) and a second semantic, $semantic_1$ (114). The operational semantics may be in the form of an input combination, a firing combination, a state of the node, or an output condition. Details of the operational semantics and their functionality are described below. Input to the node (110) is received from two or more edges, shown herein as a first edge (122) and second edge (124). Each of the first and second edges (122) and (124), respectively, represent one or more input object references. In the example shown herein, the first edge (122) is shown with first and second objects, $A_0$ (132) and $A_1$ (134), respectively, and the second edge (124) is shown with first and second objects, $B_0$ (142) and $B_1$ (144), respectively. Although each edge is shown with two objects, this limitation should not be considered limiting. In an exemplary embodiment, the edges may represent a single object or an object reference. Output from the node (110) is shown with a third edge (150) representing a function and an update of one or more objects (152) based on the operational semantics.

As shown and described herein, the pipeline nodes are annotated or subject to annotation with operational semantics. In an exemplary embodiment, the aspect of node annotation may be referred to as pipeline pre-processing. Operational semantics, which in an exemplary embodiment do not include logical operators, include input semantics, firing semantics, state semantics, and output semantics. The input semantics refer to input requirements to support a pipeline operation. In an embodiment, the input semantics may be in the form of Or and And. The firing semantics refer to received input and requirements of receipt of one or more objects for processing. In an exemplary embodiment, the firing semantics may be in the form of Any and All, where Any indicates that receipt of any object may enable processing to be initiated, and All indicates that each object must be received to enable processing to initiate. The state semantics shown and described herein refer to a state of the function as it processes incoming object(s). In an exemplary embodiment, the state semantics include No, One Shot, Sequential, and Aggregate. In an embodiment, other known or future state semantics may be utilized, and as such, the exemplary state semantics shown herein should not be considered limiting. The No state implies that the node is stateless, i.e., the node has no previous data to address. The One Shot state captures nodes that learn standard machine learning models, such as random forest and support vector machine models. In an exemplary embodiment, once these standard machine learning models are trained they are not updateable. The Sequential state captures nodes that continuously update their state, including machine learning models that support partial fit and incremental learning (such as timeseries forecasting algorithms ARIMA, Holt-Winters, BATS, Deep Learning models). The Aggregate state captures nodes whose states can be represented using conflict free replicated data types (CRDTs). The use of the Aggregate state guarantees eventual consistency on states that are commutative and associative, i.e. the eventual state is independent of the order in which the state is updated. The output semantic refers to output from the object processing. In an exemplary embodiment, the output may be presented as a single output object or two or more output objects. As shown herein, the output semantic is shown as Flatten, where the output object reference holds a list of objects that must be flattened before further processing in the DFG.

Figure 2A:
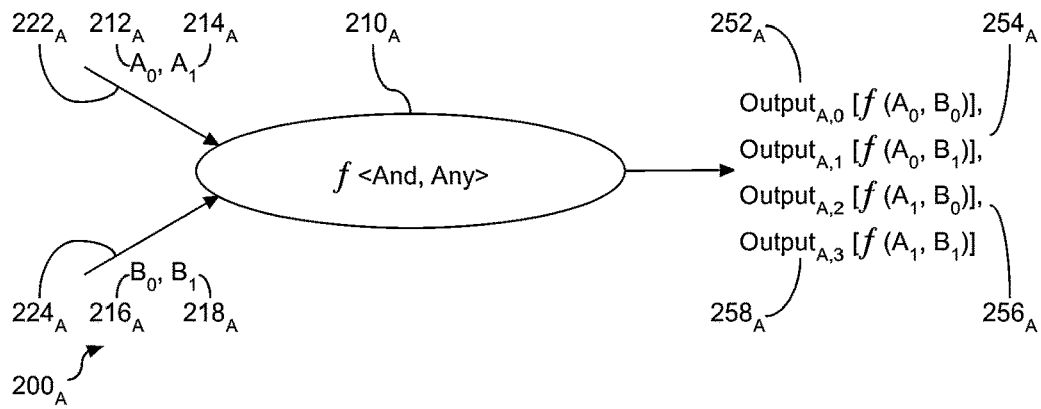
FIGS. 2A-2I depict block diagrams illustrating example node annotates of the pipeline resented in the DFG, and further depicting the annotations as different combinations of operational semantics.

Examples of the pipeline with operational semantics are provided herein. Referring to FIG. 2A, a block diagram ($200_A$) is provided to illustrate a sample node annotated with input semantics and firing semantics. As shown, the sample node ($210_A$) receives input from a first edge ($222_A$) and a second edge ($224_A$). The first edge ($222_A$) is shown with first input objects $A_0$ ($212_A$) and $A_1$ ($214_A$), and the second edge ($224_A$) is shown with second objects $B_0$ ($216_A$) and $B_1$ ($218_A$). The node ($210_A$) is shown with input annotation And and firing annotation Any. The And annotation indicates that the corresponding function represented by the node, $f$<And, Any>, needs at least one input object from every incoming edge, and the Any annotation indicates that the function can execute as long as one input from the edges has been received. Based on the node annotations, the following examples of possible output from the node for execution are shown as $output_{A,0}$ ($252_A$), $output_{A,1}$ ($254_A$), $output_{A,2}$ ($256_A$) and $output_{A,3}$ ($258_A$). In this example, the output from the node is shown as four possible combinations of objects with $output_{A,0}$ ($252_A$) representing a combination of input objects $A_0$ and $B_0$, $output_{A,1}$ ($254_A$) representing a combination of input objects $A_0$ and object $B_1$, $output_{A,2}$ ($256_A$) representing a combination of input objects $A_1$ and object $B_0$, and $output_{A,3}$ ($258_A$) representing a combination of input objects $A_1$ and $B_1$. Accordingly, the quantity of possible output and combinations of objects for processing is based on the node annotations.

Figure 2B:
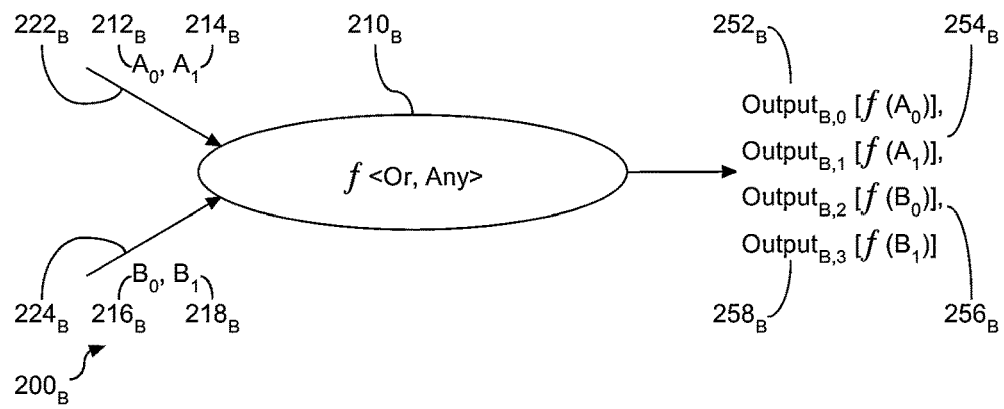

Referring to FIG. 2B, a block diagram (200B) is provided to illustrate a sample node annotated with input semantics and firing semantics. As shown, the sample node ($210_B$) receives input from a first edge ($222_B$) and a second edge ($224_B$). The first edge is shown with first input objects $A_0$ ($212_B$) and $A_1$ ($214_B$), and the second edge ($224_B$) is shown with second input objects $B_0$ ($216_B$) and $B_1$ ($218_B$). The node ($210_B$) is shown with input annotation Or and firing annotation Any. The Or annotation indicates that the function is applied to only object A or only object B, and as described in FIG. 2A the Any annotation indicates that the function can execute as long as one input from the edges has been received. Multiple forms of output are available based on this combination of node annotations, The output forms are shown as $output_{B,0}$ ($252_B$), $output_{B,1}$ ($254_B$), $output_{B,2}$ ($256_B$), and $output_{B,3}$ ($258_B$). $Output_{B,0}$ ($252_B$) represents the function as applied to input object $A_0$, $output_{B,1}$ ($254_B$) represents the function as applied to input object $A_1$, $output_{B,2}$ ($256_B$) represents the function as applied to input object $B_0$, and $output_{B,3}$ ($258_B$) represents the function as applied to input object $B_1$. As demonstrated in this example, the function may be applied to receipt of only one object from one of the edges in order to execute.

Figure 2C:
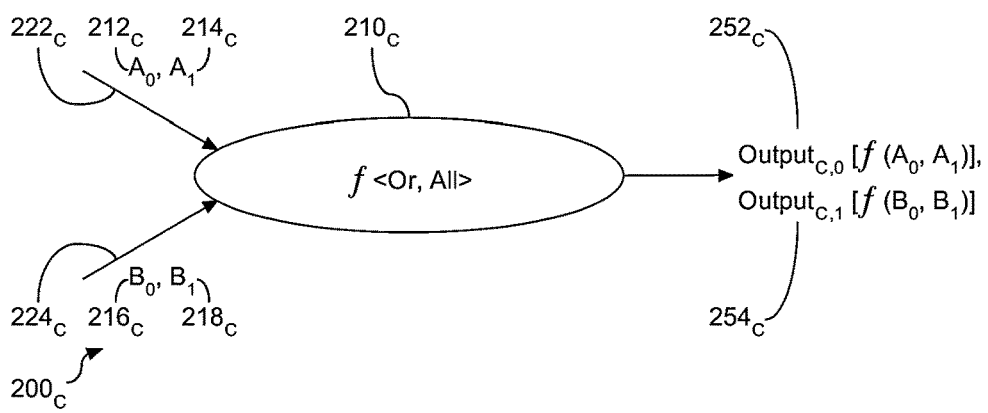

Referring to FIG. 2C, a block diagram (200C) is provided to illustrate a sample node annotated with input semantics and firing semantics. As shown, the sample node ($210_C$) receives input from a first edge ($222_C$) and a second edge ($224_C$). The first edge is shown with first input objects $A_0$ ($212_C$) and $A_1$ ($214_C$), and the second edge ($224_C$) is shown with second input objects $B_0$ ($216c$) and $B_1$ ($218c$). The node ($210_C$) is shown with input annotation Or and firing annotation All. The Or annotation indicates that the function is applied to only object A or only object B, as shown and described in FIG. 2B. The All annotation indicates that the function needs input of all of the input objects along each individual edge, e.g. objects $A_0$ and $A_1$, or objects $B_0$ and $B_1$, before the function can execute. Multiple forms of output are available based on this combination of node annotations, The output forms are shown as $\text{output}_{C,0}$ ($252_C$) and $\text{output}_{C,1}$ ($254_C$). $\text{Output}_{C,0}$ ($252_C$) represents the function as applied to input objects $A_0$ and $A_1$, and $\text{output}_{C,1}$ ($254_C$) represents the function as applied to input objects $B_0$ and $B_1$. Accordingly, and as demonstrated in this example, the function needs input based on the combination of objects as related to the corresponding input edges.

Figure 2D:
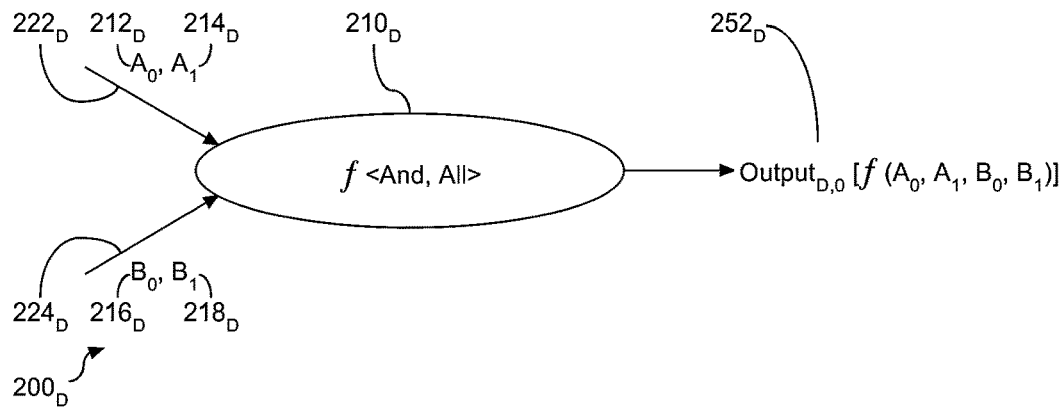

Referring to FIG. 2D, a block diagram (200D) is provided to illustrate a sample annotated node with input semantics and firing semantics. As shown, the sample node ($210_D$) receives input from a first edge ($222_D$) and a second edge ($224_D$). The first edge is shown with first input objects $A_0$ ($212_D$) and $A_1$ ($214_D$), and the second edge ($224_D$) is shown with second input objects $B_0$ ($216_D$) and $B_1$ ($218_D$). The node ($210_D$) is shown with input annotation And and firing annotation All. As shown and described in FIG. 2A, the And annotation indicates that the corresponding function of the node needs at least one input from every incoming edge, and as shown and described in FIG. 2C, the All annotation indicates that the function needs input of all of the input objects along each individual edge, e.g. objects $A_0$ and $A_1$, or objects $B_0$ and $B_1$ before the function can execute. The combination of the input and firing semantics in this example requires all inputs from every incoming edge. The output format is shown as $\text{output}_{D,0}$ ($252_D$) which represents the function as applied to input objects $A_0$, $A_1$, $B_0$, and $B_1$. Accordingly, and as demonstrated in this example, the function needs input from each input edge.

Figure 2E:
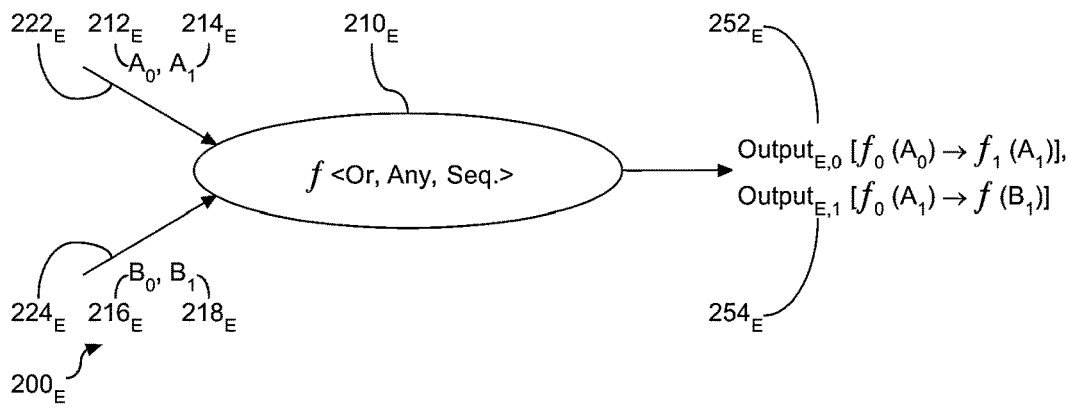

As shown in the examples of FIGS. 2A-2D, combinations of input semantics and firing semantics dictates the manner in which the received objects will be processed. State semantics is another class of object processing, and it refers to a state of the function as it processes incoming objects. Referring to FIG. 2E, a block diagram (200E) is provided to illustrate a sample node annotation with input semantics, firing semantics, and state semantics. As shown, the sample node ($210_E$) receives input from a first edge ($222_E$) and a second edge ($224_E$). The first edge is shown with first input objects $A_0$ ($212_E$) and $A_1$ ($214_E$), and the second edge ($224_E$) is shown with second input objects $B_0$ ($216_E$) and $B1$ ($218_E$). The node ($210_E$) is shown with input annotation Or, firing annotation Any, and state annotation Seq for sequential. The Or annotation indicates that the function is applied to only object A or only object B, and as described in FIG. 2A the Any annotation indicates that the function can execute as long as one input from the edges has been received. The Seq state refers to an updated state of the same function to be applied to a sequential object, where the state of the function is updated as incoming objects are processed. Multiple forms of output are available based on this combination of node annotations. The output forms are shown as $\text{output}_{E,0}$ ($252_E$) and $\text{output}_{E,1}$ ($254_E$). $\text{Output}_{E,0}$ ($252_E$) represents the function as applied to input object $A_0$ and an updated state, $f_1$, of the same function, $f_0$, for application to input object $A_1$. Similarly, $\text{Output}_{E,1}$ ($254_{E,1}$) represents the function as applied to input object $B_0$ and an updated state, $f_1$, of the same function, $f_0$, for application to input object $B_1$. In an exemplary embodiment, the updated state represents updated model parameters. Accordingly, as demonstrated in this example, the state semantic is a third annotation that may be combined with the input and firing semantics.

Figure 2F:
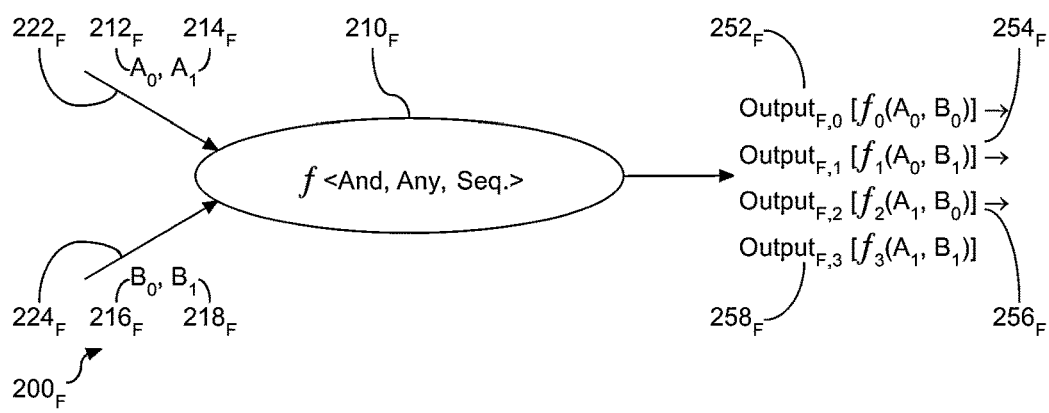

Referring to FIG. 2F, a block diagram (200F) is provided to illustrate a sample node annotation with input semantics, firing semantics, and state semantics. As shown, the sample node ($210_F$) receives input from a first edge ($222_F$) and a second edge ($224_F$). The first edge is shown with first input objects $A_0$ ($212_F$) and $A_1$ ($214_F$), and the second edge ($224_F$) is shown with second input objects $B_0$ ($216_F$) and $B_1$ ($218_F$). The node ($210_F$) is shown with input annotation And, firing annotation Any, and state annotation Seq for sequential. The combination of the input and firing annotations is shown and described in FIG. 2B. Four combinations of output are provided based on the combination of the input and firing annotations, and are shown herein as $\text{output}_{F,0}$ ($252_F$), $\text{output}_{F,1}$ ($254_F$), $\text{output}_{F,2}$ ($256_F$), and $\text{output}_{F,3}$ ($258_F$). The addition of the SEQ state semantic indicates a sequential application and execution of the output. Namely, the initial function, $f_0$, output generates an updated state of the function, $f_1$, that is then applied to the sequential combination of a next set of input objects. As shown at ($254_F$) the updated state, $f_1$, from the same function, $f_0$, represented at output ($252_F$) is applied to input objects $A_0$ and $B_1$. Similarly, the function at output ($256_F$) uses an updated state from the function represented at output ($254_F$) applied to objects $A_1$ and $B_0$, and the function at output ($258_F$) uses an updated state from the function represented at output ($256_F$) applied to objects $A_1$ and $B_1$. Accordingly, as demonstrated in this example, the state semantic is a third annotation that may be combined with the input and firing semantics.

Figure 2G:
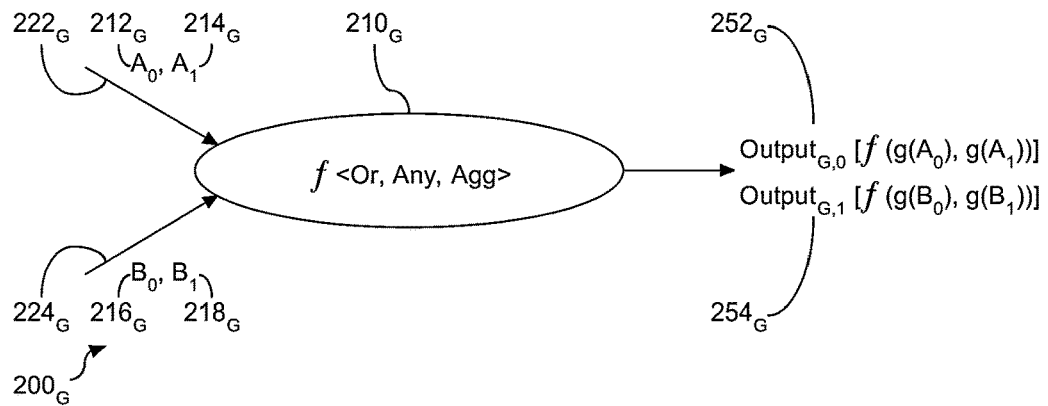

Another example of state semantics is an Aggregate annotation, referred to herein as Agg. The aggregate annotation only works with the combination of input and firing semantics of <Or,Any> and <And,Any>. The Agg annotation is applied to a combination of functions. In the examples described below, the Agg annotation executes a function, g, on a subset of data represented on one of the edges, and then executes function f on output from function g. More specifically, the Agg annotation assumes function f is commutative and associative over function g. Referring to FIG. 2G, a block diagram (200G) is provided to illustrate a sample node annotation with input semantics, firing semantics, and state semantics. As shown, the sample node ($210_G$) receives input from a first edge ($222_G$) and a second edge ($224_G$). The first edge is shown with objects $A_0$ ($212_G$) and $A_1$ ($214_G$), and the second edge ($224_G$) is shown with objects $B_0$ ($216_G$) and $B_1$ ($218_G$). The node ($210_G$) is shown with input annotation Or, firing annotation Any, and state annotation Agg. The combination of the input and firing annotation is shown and described in FIG. 2B. The addition of the Agg annotation yields two outputs, shown herein as a first output ($252_G$) and a second output ($254_G$). The first output ($252_G$) shows function g applied to objects $A_0$ ($212_G$) and $A_1$ ($214_G$), and function f applied to an aggregate of the output from function g. Similarly, the second output ($254_G$) shows function g applied to input objects $B_0$ ($216_G$) and $B_1$ ($216_G$), and function f applied to an aggregate of the output from function g. Accordingly, the second function, $f$, is shown herein as commutative and associative over function, g.

Figure 2H:
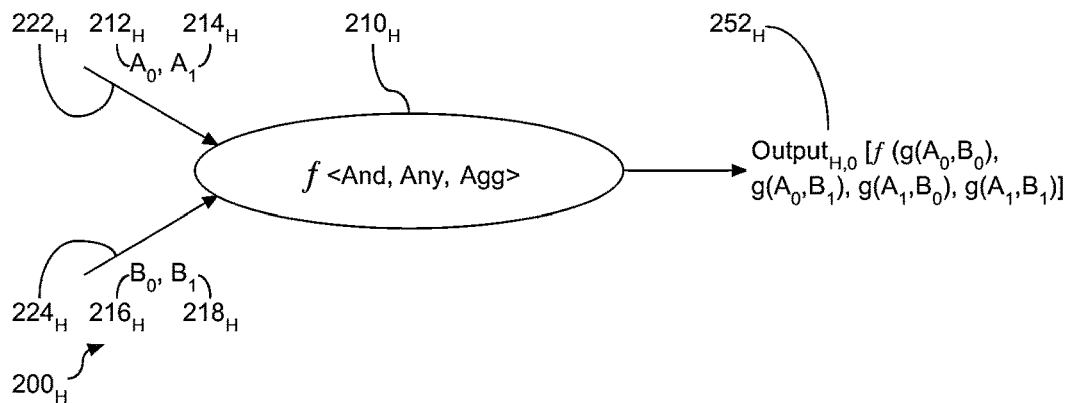

Referring to FIG. 2H, a block diagram (200H) is provided to illustrate a sample node annotation with input semantics, firing semantics, and state semantics. In this example, the combination of semantics is shown as <And, Any, Agg>. The combination of <And, Any> is shown and described in FIG. 2A. The And annotation requires input from each node. As shown herein, the addition of the Agg semantic yields an output where function g is executed on different combinations of subsets of data, and function $f$ is applied to an aggregate of the output from function g. An example of the output ($252_H$) in relation to the input objects is shown herein as $f(g(A_0,B_0), g(A_0,B_1), g(A_1,B_0), g(A_1,B_1)$. Accordingly, the first function g is applied to the different data subsets as identified by the combination of the AND and ANY annotations, and the second function $f$ is applied to an aggregate of the first function applications.

Figure 2I:
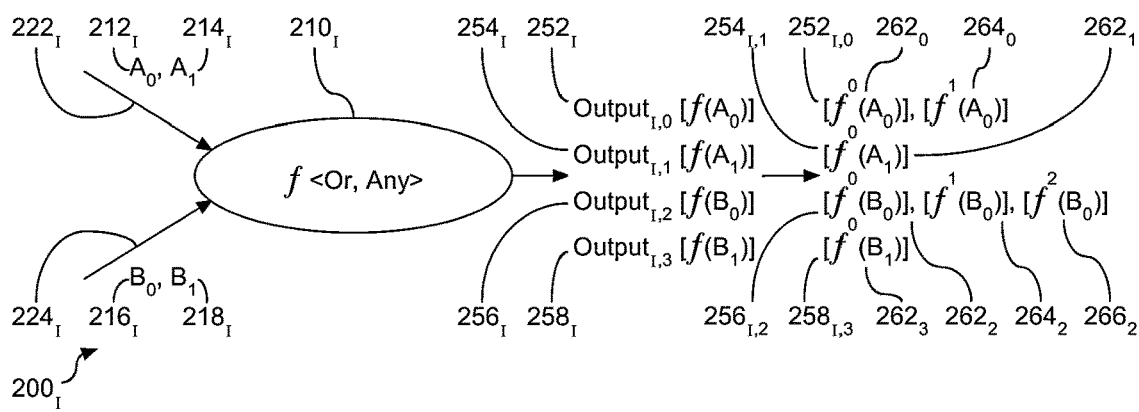

Output semantics dictate the presentation of output objects. Referring to FIG. 2I, a block diagram (200I) is provided to illustrate a sample node annotation with input semantics, firing semantics, and output semantics. The combination of input and firing semantics are shown and described in FIG. 2B. The output semantics are directed to flattening the output object or an output object reference. Flattening is directed to maintaining the output object as a single object or as two or more objects. The output objects without the output semantics are shown as $output_{I,0}$ ($252_I$), $output_{I,1}$ ($254_I$), $output_{I,2}$ ($256_I$), and $output_{I,3}$ ($258_I$). $Output_{I,0}$ ($252_I$) represents the function as applied to input object $A_0$, $output_{I,1}$ ($254_1$) represents the function as applied to input object $A_1$, $output_{I,2}$ ($256_I$) represents the function as applied to input object $B_0$, and $output_{I,3}$ ($2580$ represents the function as applied to input object $B_1$. Using the flattening semantic, $output_{I,0}$ ($252_I$) is shown at ($252_{I,0}$) separated into two objects, namely ($262_0$) and ($264_0$). $Output_{I,1}$ ($254_I$) is shown as a single object output, namely ($262_1$), $object_{I,2}$ ($256_I$) is shown separated into three objects, namely ($262_2$), ($264_1$), and ($266_2$), and $object_{I,3}$ ($258_I$) is shown as a single object output, namely ($262_3$). When separated into two or more output objects, the flattening semantic applies the same function to the same input data and segments the output object into two or more segments.

Figure 3:
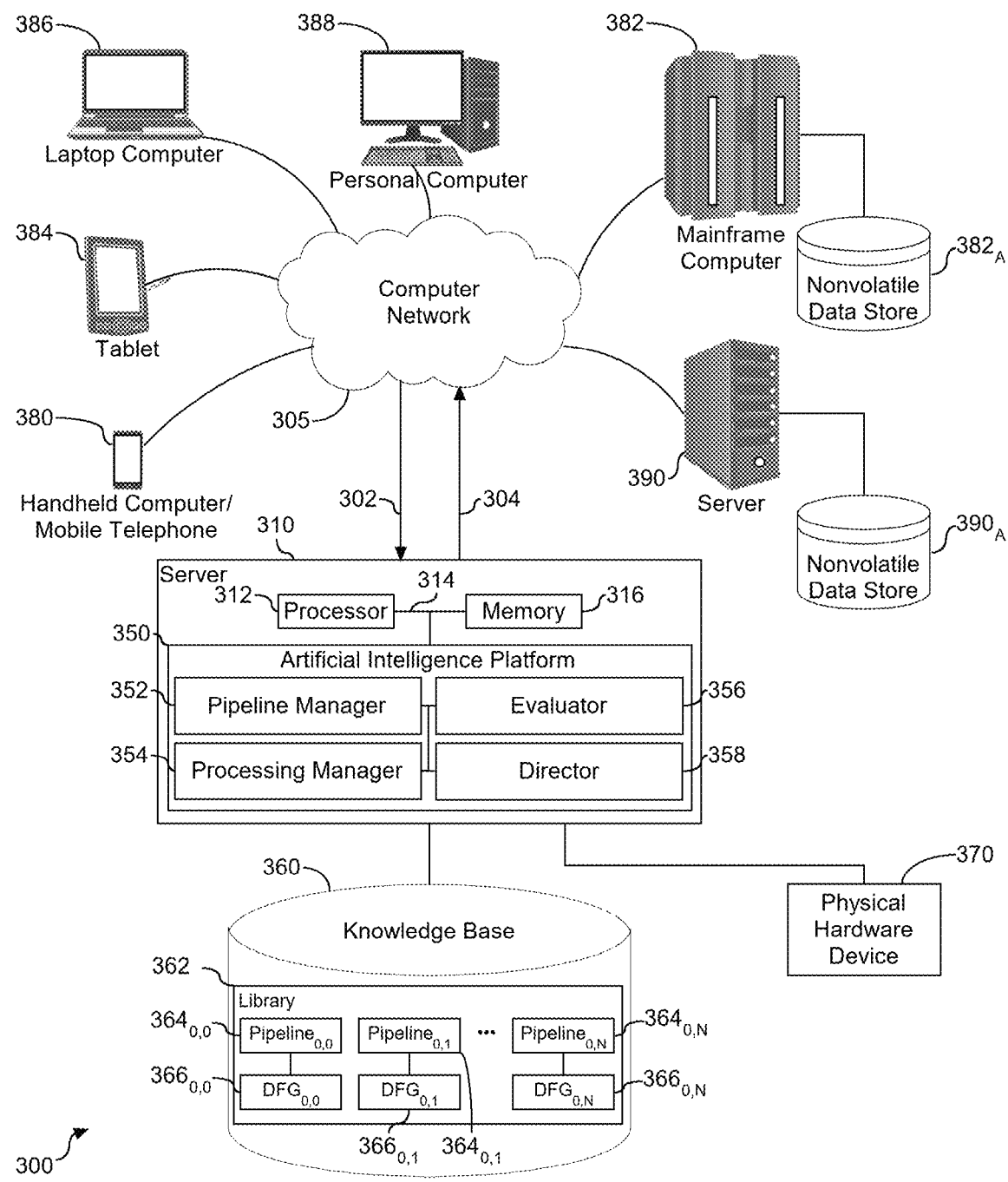
FIG. 3 depicts a computer system with tools to support and enable pipeline representation, annotation, and processing responsive to the representation and annotation.

Referring to FIG. 3, a block diagram (300) is provided to illustrate a computer system with tools to support and enable pipeline representation, annotation, and processing responsive to the representation and annotation. The tools represent a framework to simplify integration, scaling, and acceleration of complex multi-step analytics and machine learning pipelines in a distributed environment, e.g. cloud computing environment. The system and associated tools, as described herein, support pipeline representation and annotation to facilitate task processing associated with pipeline execution. As shown, a server (310) is provided in communication with a plurality of computing devices (380), (382), (384), (386), (388), and (390) across a network connection (305). The server (310) is configured with a processing unit (312), also referred to herein as a processor, operatively coupled to memory (316) across a bus (314). An artificial intelligence (AI) platform (350) is shown local to the server (310), and operatively coupled to the processing unit (312) and memory (316). As shown, the AI platform (350) contains tools in the form of a pipeline manager (352), a processing manager (354), an evaluator (356), and a director (358). Together, the tools provide functional support for pipeline management, over the network (305) from one or more computing devices (380), (382), (384), (386), (388), and (390). The computing devices (380), (382), (384), (386), (388), and (390) communicate with each other and with other devices or components via one or more wires and/or wireless data communication links, where each communication link may comprise one or more of wires, routers, switches, transmitters, receivers, or the like. In this networked arrangement, the server (310) and the network connection (305) enables pipeline representation in the form of a DFG and annotation of the DFG where semantics and associated states are programmed into the nodes of the DFG. Other embodiments of the server (310) may be used with components, systems, sub-systems, and/or devices other than those that are depicted herein.

The tools, including the AI platform (350), or in one embodiment, the tools embedded therein including the pipeline manager (352), the processing manager (354), the evaluator (356), and the director (358), may be configured to receive input from various sources, including but not limited to input from the network (305), and an operatively coupled knowledge base (360). As shown herein, the knowledge base (360) includes a library (362) of ML pipelines, shown herein as $pipeline_{0,0}$ ($364_{0,0}$), $pipeline_{0,1}$ ($364_{0,i}$), . . . , $pipeline_{0,N}$ ($364_{0,N}$). In an embodiment, the ML pipeline may be communicated to the AI platform (350) across the network (305). The quantity of pipelines in the library (362) is for illustrative purposes and should not be considered limiting. In an exemplary embodiment, the represented pipelines have a corresponding DFG, which in an embodiment is annotated. As shown, $pipeline_{0,0}$ ($364_{0,0}$) is associated with $DFG_{0,0}$ ($366_{0,0}$), $pipeline_{0,1}$ ($364_{0,1}$) is associated with $DFG_{0,1}$ ($366_{0,1}$), . . . , and $pipeline_{0,N}$ ($364_{0,N}$) is associated with $DFG_{0,N}$ ($366_{0,N}$). In an embodiment, the DFGs shown in the knowledge base (360) may be annotated or subject to annotation. Although each pipeline in the knowledge base (360) is shown with a corresponding DFG, in an exemplary embodiment, one or more of the represented pipelines may not have a corresponding DFG. Similarly, in an exemplary embodiment, the DFG may have different representations based on the annotations, and as such two or more annotated DFGs may be associated with a corresponding pipeline. Similarly, in an exemplary embodiment, the knowledge base (360) may include one or more additional libraries each having one more pipelines therein. As such, the quantity of libraries shown and described herein should not be considered limiting.

The various computing devices (380), (382), (384), (386), (388), and (390) in communication with the network (305) demonstrate access points for the AI platform (350) and the corresponding tools, including the pipeline manager (352), the processing manager (354), the evaluator (356), and the director (358). Some of the computing devices may include devices for use by the AI platform (350), and in one embodiment the tools (352), (354), (356), and (358) to support pipeline representation, annotation of the representation, and processing of the pipeline based on the annotated representation, and dynamically generate a control signal to a physical hardware device associated with the annotated pipeline representation. By way of example, a physical hardware device (370) is shown operatively coupled to the server (310). In an exemplary embodiment, the control signal selectively controls the operatively coupled physical hardware device (370), with the control signal selectively modifying a physical functional aspect of the device (370). In an embodiment, the device (370) may be a first physical device operatively coupled to an internal component, or in an embodiment a second physical device, and the issued first signal may modify an operating state of the internal component or the second device. For example, the first device (370) may be a product dispenser, and the control signal may modify or control a product dispensing rate to accommodate the rate at which the second device receives the dispensed product. In an embodiment, the director (358) computes a control action based on output generated from execution of the annotated DFG, and constructs or configures the control signal that aligns or is commensurate with the computed control action. In an exemplary embodiment, the control action may be applied as a feedback signal to directly control an event injection to maximize a likelihood of realizing an event or operating state of the device (370).

The network (305) may include local network connections and remote connections in various embodiments, such that the AI platform (350) and the embedded tools (352), (354), (356), and (358) may operate in environments of any size, including local and global, e.g. the Internet, distributed cloud computing environment, etc. Accordingly, the server (310) and the AI platform (350) serve as a front-end system, with the knowledge base (360) and one or more of ML pipelines and associated DFGs serving as the back-end system.

As shown in the knowledge base (360), each pipeline is associated with a DFG. The pipeline manager (352) is configured to represent one or more pipelines as a DFG in which individual nodes of the DFG represent an instance of a mathematical operation and individual nodes represent an object or an object reference. In an embodiment, one or more DFG tools, such as data flow software may be utilized for the pipeline representation. Once created, the DFG is associated with the pipeline and stored in the knowledge base (360). In an embodiment, the pipeline is a ML pipeline. Similarly, in an embodiment, the object reference represented in a node of the DFG is a pointer to a potentially unrealized object. The processing manager (354), shown herein operatively coupled to the pipeline manager (352), is configured to pre-process the pipeline represented in the DFG. The aspect of pipeline pre-processing includes annotation of the nodes or a subset of the nodes represented in the DFG by the processing manager (354), with the annotations including two or more operational semantics. The node annotations may be directed at a serial workload or a parallel workload, with the serial workload configured for sequential object processing and the parallel workload configured to support and process concurrent processing of two or more pipeline tasks across two or more nodes in the annotated DFG. In an exemplary embodiment, the annotations are in the form of two or more operational semantics, with the operational semantics including an input combination, a firing combination, a state of the node, or an output condition. Examples of the node annotations are shown and described in FIG. 2A-2I. Accordingly, the processing manager (354) functions to support and enable annotation of the nodes represented in the DFG with a combination of operational semantics.

The evaluator (356), shown herein operatively coupled to the processing manager (354), is configured to evaluate the annotated DFG. The evaluation encompasses is referred to herein as pre-processing which entails processing objects or object references in view of operatively coupled nodes and annotations of those nodes. In an exemplary embodiment, the evaluator (356) processes the node annotations and discovers an order of execution of the object(s) or object reference(s) based on the node annotations. This discovery of the execution order of the objects enables or causes the evaluator (356) to control a scheduling order in order to process, arrange, control, or otherwise optimize a corresponding workload. In an embodiment, the evaluation entails the evaluator (356) determining node input and a node state. In an exemplary embodiment, the pre-processing supported by the evaluator (356) facilitates determining a production path for the form and function of the physical device (370). With respect to the scheduling order, the evaluator (356) determines when operations reflected in the pre-processed pipeline represented in the DFG are scheduled. In an exemplary embodiment, the scheduling order controls when production is initiated. For example, in a manufacturing environment, the physical device (370) may require release of one or more materials, and the scheduling order may control production to align with receipt or flow of the requirement material(s).

As shown, the director (358) is operatively coupled to the AI platform (350) and the embedded tools (352)-(358). In an embodiment, the director (358) may be embedded in the AI platform (350). The director (358) is configured to execute the pipeline represented in the annotated DFG based on the evaluation and pre-processing conducted by the evaluator (356). With respect to the example manufacturing environment of the physical device (370), by executing the annotated DFG in view of the scheduling order, the director (358) enables the dispatch of the scheduling order, thereby effectively implementing, and in an embodiment controlling, the scheduling order. When the scheduling order is implemented, the object(s) represented in the DFG are realized, which in a manufacturing environment facilitates or enables materials to be released so that work flows through an associated production line, thereby enabling, supporting, and in an embodiment transforming, the functionality of the physical device (370). In an embodiment, the object reference in the annotated DFG is a pointer to a potentially unrealized object. As shown in FIGS. 2A-2I, the output semantics of the node annotation dictates the manner in which output from the DFG is constructed. The director (358) functions to construct the output in a manner that aligns with the output semantics, or in an embodiment the condition of the output semantic, referred to herein as an output condition semantic. In constructing the output, the director (358) dynamically configures and issues a control signal to the physical device (370), with the control signal based on the constructed output. The configured and issued control signal selectively controls a functional aspect of the physical device (370). In an embodiment, the device (370) may be a first physical device operatively coupled to an internal component, or in an embodiment a second physical device, and the issued first signal may modify an operating state of the internal component or the second device. For example, the first device (370) may be a product dispenser, and the control signal may modify or control a product dispensing rate to accommodate the rate at which the second device receives the dispensed product. In an embodiment, the director (358) computes a control action based on output generated from execution of the annotated DFG, and constructs or configures the control signal that aligns or is commensurate with the computed control action. In an exemplary embodiment, the control action may be applied as a feedback signal to directly control an event injection to maximize a likelihood of realizing an event or operating state of the device (370).

Although shown as being embodied in or integrated with the server (310), the AI platform (350) may be implemented in a separate computing system (e.g., 390) that is connected across the network (305) to the server (310). Similarly, although shown local to the server (310), the tools (352), (354), (356), and (358) may be collectively or individually distributed across the network (305). Wherever embodied, the pipeline manager (352), the processing manager (354), the evaluator (356), and the director (358) are utilized to support and enable efficient pipeline representation and associated annotation of the representation to effectively and efficiently process, schedule, and execute the pipeline.

Types of information handling systems that can utilize server (310) range from small handheld devices, such as a handheld computer/mobile telephone (380) to large mainframe systems, such as a mainframe computer (382). Examples of a handheld computer (380) include personal digital assistants (PDAs), personal entertainment devices, such as MP4 players, portable televisions, and compact disc players. Other examples of information handling systems include a pen or tablet computer (384), a laptop or notebook computer (386), a personal computer system (388) and a server (390). As shown, the various information handling systems can be networked together using computer network (305). Types of computer network (305) that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server (390) utilizes nonvolatile data store ($390_A$), and mainframe computer (382) utilizes nonvolatile data store ($382_A$). The nonvolatile data store ($382_A$) can be a component that is external to the various information handling systems or can be internal to one of the information handling systems.

Information handling systems may take many forms, some of which are shown in FIG. 3. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 4:
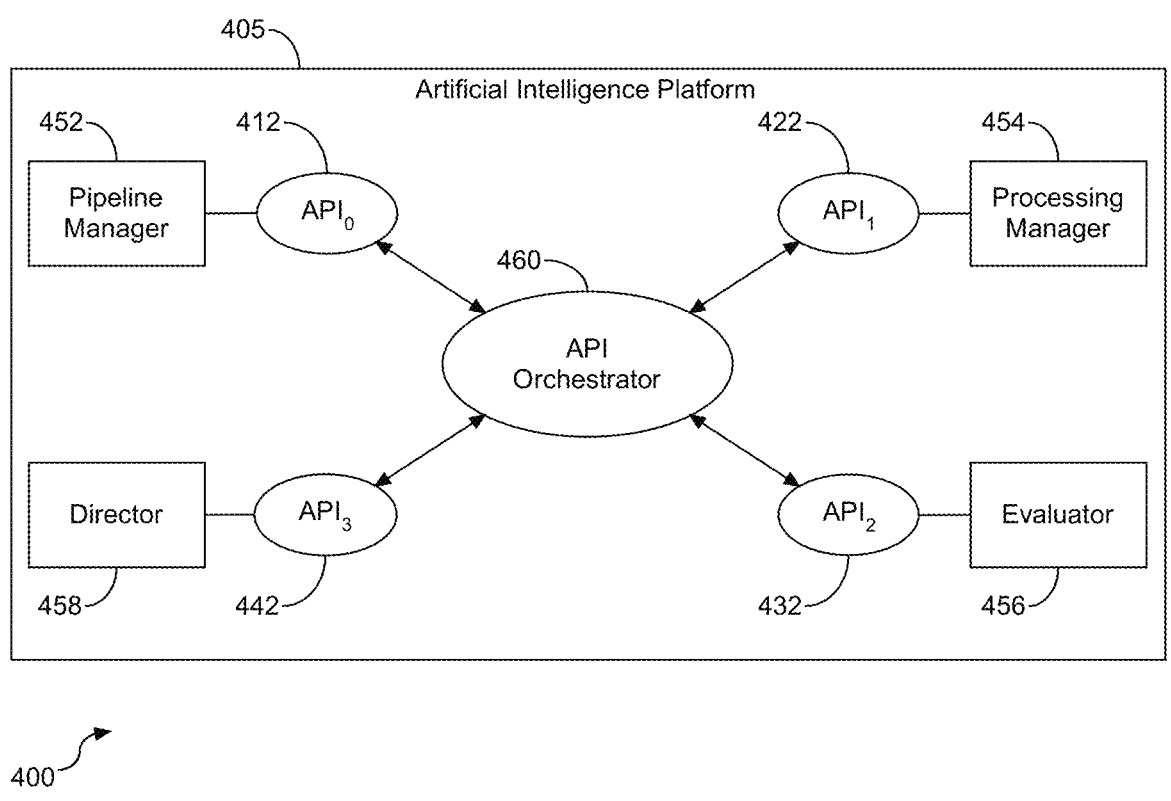
FIG. 4 depicts a block diagram a block diagram is provided illustrating the tools shown in FIG. 3 and their associated APIs.

An Application Program Interface (API) is understood in the art as a software intermediary between two or more applications. With respect to the embodiments shown and described in FIG. 3, one or more APIs may be utilized to support one or more of the AI platform tools, including the pipeline manager (352), the processing manager (354), the evaluator (356), and the director (358), and their associated functionality. Referring to FIG. 4, a block diagram (400) is provided illustrating the AI platform tools and their associated APIs. As shown, a plurality of tools are embedded within the AI platform (405), with the tools including the pipeline manager (452) associated with $API_0$ (412), the processing manager (454) associated with $API_1$ (422), the evaluator (456) associated with $API_2$ (432), and the director (458) associated with $API_3$ (442). Each of the APIs may be implemented in one or more languages and interface specifications.

$API_0$ (412) provides support for representing a pipeline in a DFG, with one or more nodes of the DFG representing an instance of a mathematical operation, and individual edges representing an object or an object reference. $API_1$ (422) provides pre-processing the represented pipeline. The pre-processing includes support for node annotations in the form of operational semantics. $API_2$ (432) provides support for evaluation of the pre-processed pipeline represented in the DFG, which includes controlling a scheduling order based on the evaluation, and using the node annotations to discover an order of execution. $API_3$ (442) provides support for executing the pipeline as represented in the annotated and preprocessing DFG.

As shown, each of the APIs (412), (422), (432), and (442) are operatively coupled to an API orchestrator (460), otherwise known as an orchestration layer, which is understood in the art to function as an abstraction layer to transparently thread together the separate APIs. In one embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 5:
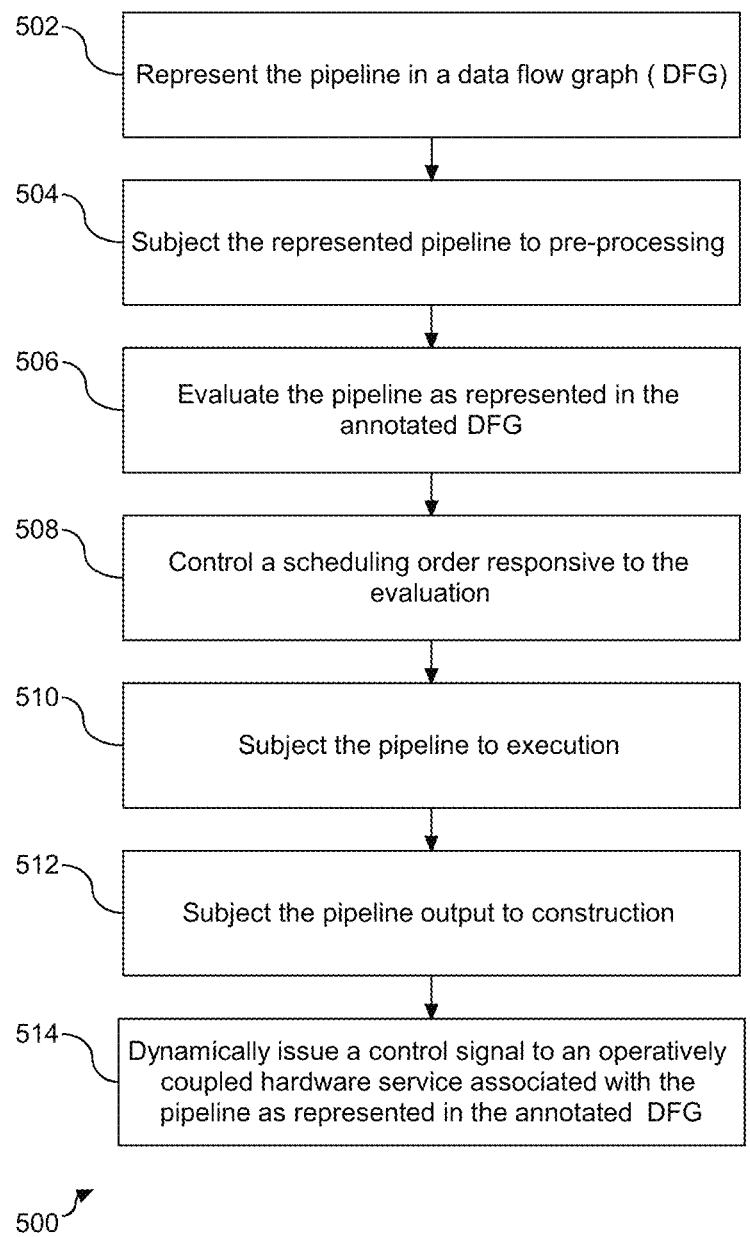
FIG. 5 depicts a flow chart to illustrate a process for pipeline representation, and pipeline processing responsive to the representation.

Referring to FIG. 5, a flow chart (500) is provided to illustrate a process for pipeline representation, and pipeline processing responsive to the representation. As shown, the pipeline is represented in a DFG (502). Examples of the representation(s) is shown and described in FIGS. 2A-2I, with individual nodes in the DFG representing an instance of a mathematical operation and individual edges in the DFG representing an object or an object reference, i.e. an address of a memory location where the object is located. The represented pipeline is then subject to pre-processing (504), which in an exemplary embodiment includes annotating one or more of the nodes of the DFG with two or more operational semantics. As described in FIG. 1 and shows in the examples of FIGS. 2A-2I, the operation semantics of the annotated nodes includes an input combination, a firing combination, a state of the node, or an output condition. Once the DFG has been pre-processed, the pipeline as represented in the annotated DFG is subject to evaluation (506), which includes discovering an order of pipeline execution based on the node annotations. In addition, the DFG evaluation at step (506) includes determining both node input and state of the node, also referred to herein as node state. A corresponding scheduling order is controlled or subject to being controlled in response to the annotated DFG evaluation (508), which in an exemplary embodiment includes determining node input and a node state. Accordingly, steps (502)-(508) demonstrate the elements of pipeline representation and scheduling order control.

Following step (508), a task may be submitted to the pipeline representation, and the pipeline is subject to execution (510), which in an embodiment includes realizing the object or the object reference. In an exemplary embodiment, the pipeline execution at step (510) may include concurrent submission and processing or two or more tasks across two or more nodes in the annotated DFG. Output is generated or created from the pipeline execution. The pipeline output is subject to construction, which includes aligning the output with the output condition semantic that is represented in the annotated DFG (512). Execution of the represented pipeline at step (510) and the output representation at step (512) is followed by dynamic issuance of a control signal to an operatively coupled hardware device, a process controlled by software, or a combination of the physical hardware device and the software, that is associated with the pipeline as represented in the annotated DFG (514). The issuance of the control signal includes configuring or formatting the control signal based on the constructed output at step (512). The control signal, or in an embodiment a feedback signal, is configured to selectively control or modify an event injection to the operatively coupled hardware device, the process controlled by software, or the combination of the physical hardware device and the software, associated with the pipeline.

As shown and described above in FIG. 3, aspects of the tools (352), (354), (356), and (358) and their associated functionality may be embodied in a computer system/server in a single location, or in an embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the system and processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments (610) where tasks are performed by remote processing devices that are linked through a communications network. In a distributed cloud computing environment, program modules may be located in both local and remote computer system storage media including memory storage devices.

Figure 6:
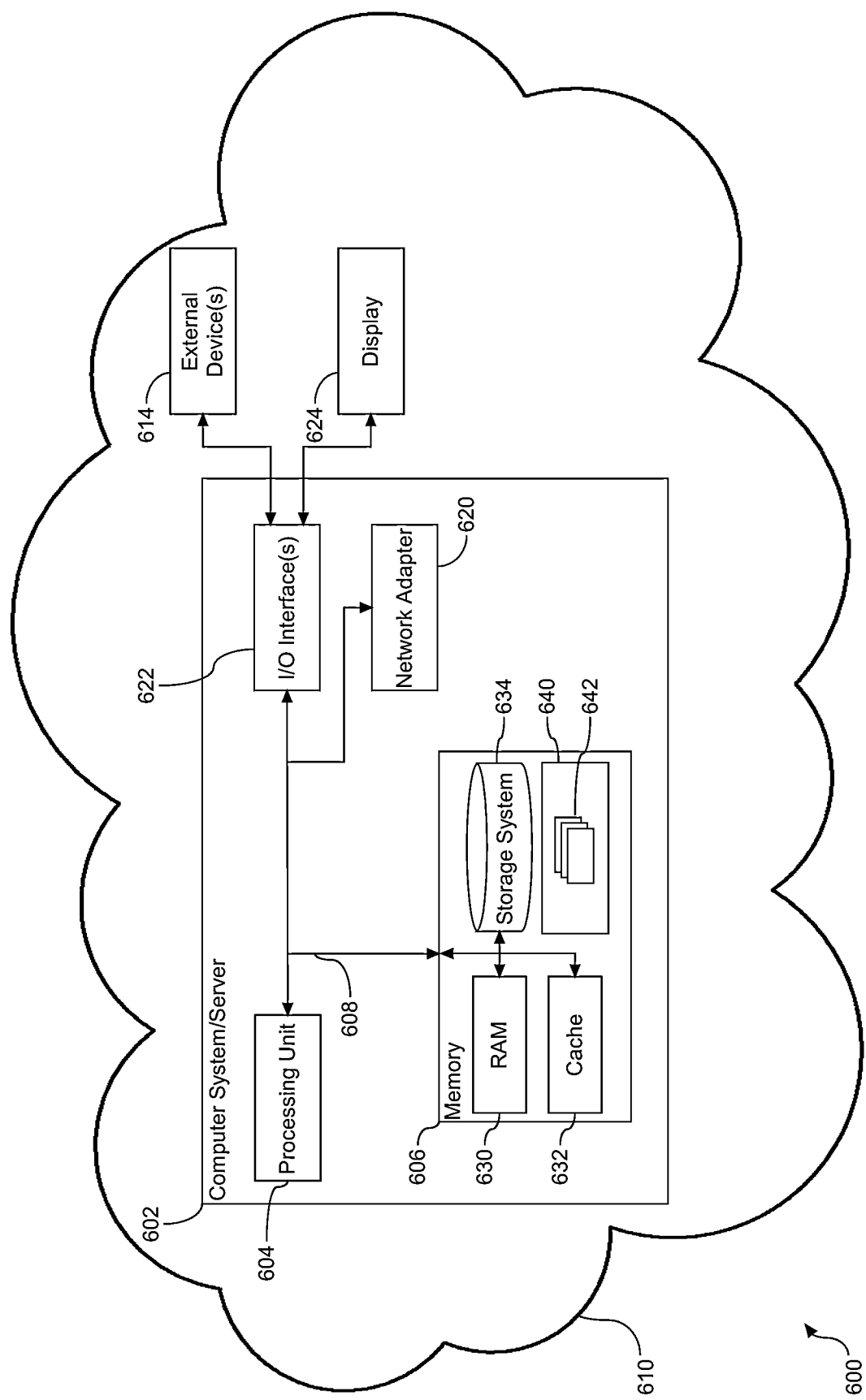
FIG. 6 is a block diagram depicting an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of pipeline representation and processing. For example, the set of program modules (642) may include the modules configured as the tools (352), (354), (356), and (358) described in FIG. 3.

Host (602) may also communicate with one or more external devices (614), such as a keyboard, a pointing device, a sensory input device, a sensory output device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

In one embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
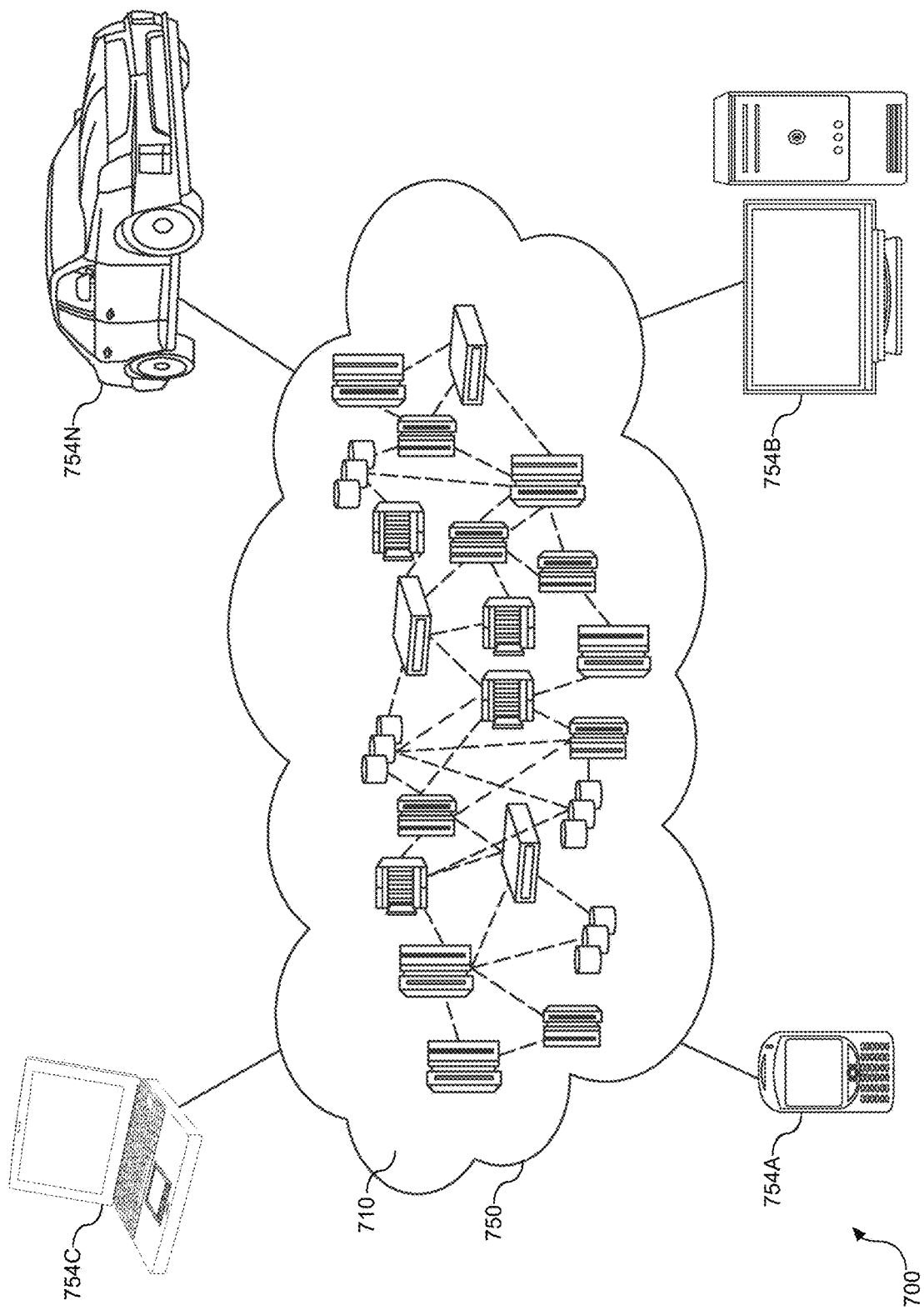
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
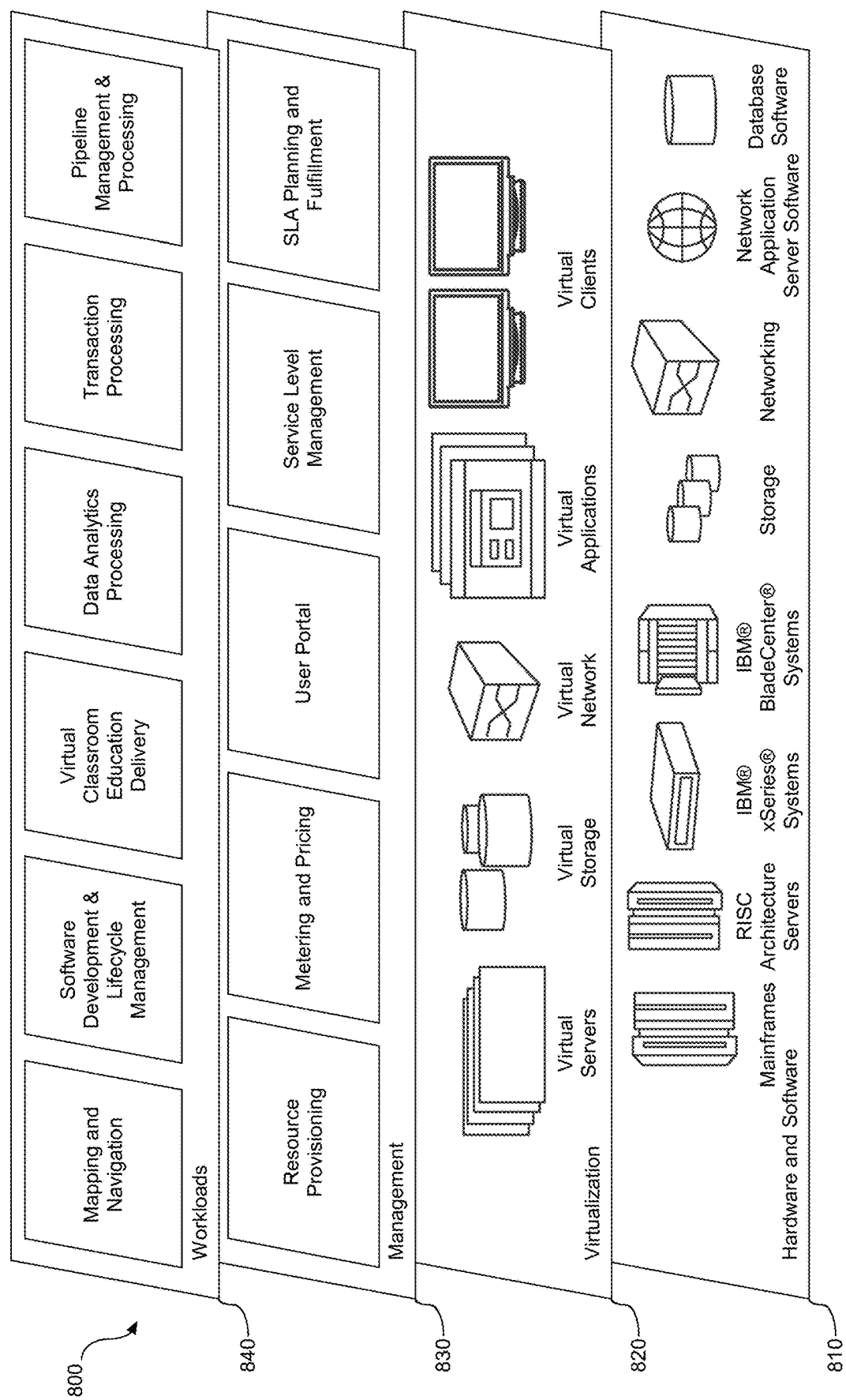
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and pipeline management and processing.

The system and flow charts shown herein may also be in the form of a computer program device for entity linking in a logical neural network. The device has program code embodied therewith. The program code is executable by a processing unit to support the described functionality.

While particular embodiments have been shown and described, it will be obvious to those skilled in the art that, based upon the teachings herein, changes and modifications may be made without departing from its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to the embodiments containing only one such element, even when the same claim includes the introductory phrases "one or more" or "at least one" and indefinite articles such as "a" or "an"; the same holds true for the use in the claims of definite articles.

The present embodiment(s) may be a system, a method, and/or a computer program product. In addition, selected aspects of the present embodiment(s) may take the form of an entirely hardware embodiment, an entirely software embodiment (including firmware, resident software, microcode, etc.) or an embodiment combining software and/or hardware aspects that may all generally be referred to herein as a "circuit," "module" or "system." Furthermore, aspects of the present embodiment(s) may take the form of computer program product embodied in a computer readable storage medium (or media) having computer readable program instructions thereon for causing a processor to carry out aspects of the present embodiment(s). Thus embodied, the disclosed system, a method, and/or a computer program product are operative to improve the functionality and operation of dynamical orchestration of a pre-requisite driven codified infrastructure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiment(s) may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiment(s). In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiment(s). In particular, the pipeline processing and execution may be carried out by different computing platforms or across multiple devices. Furthermore, the libraries may be localized, remote, or spread across multiple systems. Accordingly, the scope of protection of the embodiment(s) is limited only by the following claims and their equivalents.

What is claimed is:

1. A computer system comprising:
a processor operatively coupled to memory;
an artificial intelligence (AI) platform, operatively coupled to the processor, comprising:
a pipeline manager configured to represent a pipeline in a data flow graph (DFG) with individual nodes representing an instance of a mathematical operation and individual edges representing an object;
a processing manager configured to pre-processing the pipeline represented in the DFG, including selectively annotate one or more of the nodes in the DFG with two or more operational semantics, the semantics comprising an input combination, a firing combination, a state of the node, an output condition, or a combination thereof; and
an evaluator configured to evaluate the annotated DFG and control a scheduling order responsive to the evaluation, including discover an order of execution based on the node annotations; and
a director configured to execute the pipeline represented in the annotated DFG responsive to the evaluation, and construct output from the executed pipeline, the constructed output configured to align with an output condition semantic.

2. The computer system of claim 1, further comprising the director configured to dynamically configure and issue a control signal, the control signal configuration based on the constructed output to an operatively coupled physical hardware device, a process controlled by software, or a combination thereof, associated with the annotated DFG, the control signal to selectively control a physical state of the operatively coupled device, the software, or a combination thereof.

3. The computer system of claim 2, wherein execution of the pipeline represented in the annotated DFG responsive to the evaluation includes creating a representation of the object in the annotated DFG.

4. The computer system of claim 3, wherein the object is a pointer to a potentially unrealized object.

5. The computer system of claim 2, wherein evaluation of the annotated DFG and control of the scheduling order includes the evaluator to determine node input and node state.

6. The computer system of claim 1, further comprising the processing manager configured to concurrently submit two or more tasks across two or more nodes in the annotated DFG.

7. The computer system of claim 1, wherein the pipeline is a machine learning pipeline.

8. A computer program product configured to interface with a computer readable storage medium having program code embodied therewith, the program code executable by a processor to:
represent a pipeline in a data flow graph (DFG) with individual nodes representing an instance of a mathematical operation and individual edges representing an object;

pre-process the pipeline represented in the DFG, the pre-processing including program code configured to selectively annotate one or more of the nodes with two or more operational semantics, the semantics comprising an input combination, a firing combination, a state of the node, an output condition, or a combination thereof;

evaluate the annotated DFG and control a scheduling order responsive to the evaluation, including discover an order of execution based on the node annotations; and execute the pipeline represented in the annotated DFG responsive to the evaluation, and construct output from the executed pipeline, the constructed output configured to align with an output condition semantic.

9. The computer program product of claim 8, further comprising program code configured to dynamically configure and issue a control signal, the control signal configuration based on the constructed output to an operatively coupled physical hardware device, a process controlled by software, or a combination thereof, associated with the annotated DFG, the control signal configured to selectively control a physical state of the operatively coupled device, the software, or a combination thereof.

10. The computer program product of claim 9, wherein executing the pipeline represented in the annotated DFG responsive to the evaluation includes creating representation of the object in the annotated DEG.

11. The computer program product of claim 10, wherein the object is a pointer to a potentially unrealized object.

12. The computer program product of claim 9, wherein evaluation of the annotated DFG and control of the scheduling order includes program code to determine node input and node state.

13. The computer program product of claim 8, further comprising program code configured to concurrently submit two or more tasks across two or more nodes in the annotated DFG.

14. The computer program product of claim 8, wherein the pipeline is a machine learning pipeline.

15. A computer implemented method comprising:
representing a pipeline in a data flow graph (DFG) with individual nodes representing an instance of a mathematical operation and individual edges representing an object;

pre-processing the pipeline represented in the DFG, the pre-processing including selectively annotating one or more of the nodes with two or more operational semantics, the semantics comprising an input combination, a firing combination, a state of the node, an output condition, or a combination thereof;

evaluating the annotated DFG and controlling a scheduling order responsive to the evaluation, including discovering an order of execution based on the node annotations; and executing the pipeline represented in the annotated DFG responsive to the evaluation, and constructing output from the executed pipeline, the constructed output configured to align with an output condition semantic.

16. The computer implemented method of claim 15, further comprising dynamically configuring and issuing a control signal, the control signal configuration based on the constructed output to an operatively coupled physical hardware device, a process controlled by software, or a combination thereof, associated with the annotated DFG, the control signal configured to selectively control a physical state of the operatively coupled device, the software, or a combination thereof.

17. The computer implemented method of claim 16, wherein executing the pipeline represented in the annotated DFG responsive to the evaluation includes creating a representation of the object in the annotated DEG.

18. The computer implemented method of claim 17, wherein the object is a pointer to a potentially unrealized object.

19. The computer implemented method of claim 16, wherein evaluating the annotated DFG and controlling the scheduling order includes determining node input and node state.

20. The computer system of claim 1, wherein the output semantics are directed to flattening the output object.

* * * * *